United States Patent [19]
Dabbaj

[11] Patent Number: 5,822,110
[45] Date of Patent: Oct. 13, 1998

[54] REFLECTIVE LIGHT VALVE MODULATOR

[76] Inventor: Rad Hassan Dabbaj, Williams, Powell & Associates, 34 Tavistock Street, London, England, WC2E 7PB

[21] Appl. No.: 793,643
[22] PCT Filed: Sep. 1, 1995
[86] PCT No.: PCT/GB95/02061
 § 371 Date: May 13, 1997
 § 102(e) Date: May 13, 1997
[87] PCT Pub. No.: WO96/08031
 PCT Pub. Date: Mar. 14, 1996

[30] Foreign Application Priority Data

Sep. 2, 1994 [GB] United Kingdom .................... 9417756
Apr. 7, 1995 [GB] United Kingdom .................... 9507306

[51] Int. Cl.$^6$ .................................................. G02B 26/00
[52] U.S. Cl. ...................... 359/293; 359/291; 359/295; 359/846; 348/771; 348/772
[58] Field of Search ..................................... 359/290, 291, 359/293, 295, 223, 230, 846; 348/770, 771, 772, 775

[56] References Cited

U.S. PATENT DOCUMENTS

| | | | |
|---|---|---|---|
| 3,001,447 | 9/1961 | Ploke ........................................ | 359/295 |
| 3,626,084 | 12/1971 | Wohl et al. ............................... | 348/772 |
| 3,858,080 | 12/1974 | Wohl . | |
| 3,879,630 | 4/1975 | Halperin et al. ......................... | 359/291 |
| 3,990,783 | 11/1976 | Kohashi ................................... | 359/293 |
| 4,035,061 | 7/1977 | Sheridon ................................. | 359/295 |
| 4,441,791 | 4/1984 | Hornbeck ................................. | 359/293 |
| 5,471,341 | 11/1995 | Warde et al. ............................. | 359/293 |

OTHER PUBLICATIONS

E. T. Kozol, Technical Disclosure Bulletin, vol. 19, No. 1, Jun. 1976, pp. 102–103.
Sansom et al, Deformographic Storage Display Tube, Sep. 1971, pp. 324–329.

*Primary Examiner*—Loha Ben
*Attorney, Agent, or Firm*—Connolly & Hutz

[57] ABSTRACT

A light valve modulator of reflective operation which includes a multi-layer structure which is controlled electrostatically, comprises a transparent substrate supporting a first transparent deformable layer and a second insulating dielectric deformable layer, with a mirror layer sandwiched between, and a third, dielectric insulating layer on the outside of the second layer, at least one of the layers between the second layer and the substrate being electrically conductive, and the third dielectric layer being capable of receiving an electric charge pattern by means of one or more electron beams, whereby the mirror layer is locally deformed by electrostatic forces occurring between the third layer and the conductive layer.

The twin deformably layers allow good sensitivity, while the outside dielectric layer which receives charge from an electron beam protects the deformable layers from electron bombardment and the cathode from outgassing.

The modulator is for use in display tubes, particularly for projection TV.

25 Claims, 2 Drawing Sheets

REFLECTIVE LIGHT VALVE MODULATOR

This invention relates to projection display systems and to a light valve for use in such systems.

A well known class of projection displays based on electron beam addressed Oil-Film, such as the Eidophor and GE light valve, provide high quality projection systems at the top end of the market which is almost unrivalled by any other technology. However, they suffer from oil decomposition and cathode poisoning, short life, very high system complexity and high cost.

Another class of projection display system uses the so-called deformographic storage display tube (DSDT), as described in U.S. Pat. No. 3,676,588 which uses a deformable layer and a mirror to effect light valve projection display. This device has two vacuum chambers with a necessary thick mica membrane for isolating the two chambers. The membrane is difficult to handle and mount, and cannot be made thin enough for good resolution. This was followed by IBM's single chamber DSDT, U.S. Pat. No. 3,858,080, in which an electron beam deposits charge pattern on a dielectric mirror lying over an elastomer layer attached on the inside faceplate of the tube. The charge pattern deforms the mirror and effects light modulation. The disadvantages of this patent are: dielectric mirrors are difficult to make especially on a deformable layer, and cannot be made as thin as a metal layer. The mirror is stiff, leading to low sensitivity and low resolution. Therefore, there are serious conflicting requirements: on the one hand it is desirable to make all layers above the deformable layer thick enough for good deformable layer sealing and isolation from an electron beam but on the other hand the opposite requirement is desired for good sensitivity.

The required performance of light vales suitable for the reproduction of Television (TV) and High Definition Television (HDTV) pictures and images are very demanding. The present invention seeks to fulfill all or most of these requirements.

According to the invention, there is provided a light valve modulator of reflective operation which includes a multi-layer structure which is controlled electrostatically, comprising a transparent substrate supporting a first transparent deformable layer and a second insulating dielectric deformable layer, with a mirror layer sandwiched between, and a third, dielectric insulating layer on the outside of the second layer, at least one of the layers between the second layer and the substrate being electrically conductive, and the third dielectric layer being capable of receiving an electric charge pattern by means of one or more electron beams, whereby the mirror layer is locally deformed by electrostatic forces occurring between the third layer and the conductive layer.

Such a structure permits the use of deformable materials such as elastomers inside vacuum electron beam tubes, a task normally very problematic. The harmonisation between electron beam and deformable materials (elastomers is brought about because the third layer may simultaneously provide a number of desirable functions such as: electron beam bombardment protection, high resolution, sealing and sensitivity enhancement.

According to a further aspect, the invention proposes deformable light valve display tube comprising an envelope with a transparent faceplate facing one or more electron guns, wherein a light valve modulator as mentioned above is mounted within said faceplate. In particular, the faceplate may itself form the transparent substrate of the modulator.

A practical projection system e.g. for T.V. applications may then comprise a light source, a schlieren-type optical system, a screen and a deformable light valve display tube as mentioned above, wherein the latter is controlled by signals which cause the light valve modulator to modulate light received from the light source whereby the optical system projects a television-type picture on the screen. Such a system may project onto the front or back of the screen.

In order that the invention in its various aspects shall be clearly understood, various exemplary embodiments thereof will now be described by way of example with reference to the accompanying drawings, in which.

Figure 1:
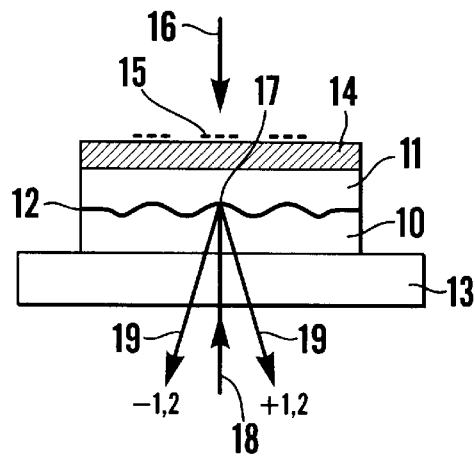
FIG. 1 illustrates a light valve modulator according to the invention operating in one mode.

A first example of a light valve modulator is shown in FIG. 1 in which the modulator comprises two deformable layers 10, 11, sandwiching a conductive reflecting mirror layer 12. Layer 10 is transparent to the light being modulated and is firmly attached to a substrate 13; layer 11 is of dielectric insulating material. A dielectric insulating layer 14 is formed on top of layer 11, and is preferably stiffer than layers 10, 11. A charge pattern 15 is deposited by an electron beam (eb) 16 on the insulating layer 14. In conjunction with the conductive mirror layer 12 which constitutes an electrode (e.g. final anode of eb tube) acting as a reference for charging/discharging the modulator, the charge pattern 15 establishes electrostatic forces which lead to preferably substantially sinusoidal phase or diffraction grating type of deformation 17 of the mirror layer between layers 10, 11, causing an incident light 18 to be diffracted into one or more higher beams 19, e.g. plus and minus first, second . . . etc. orders. In conjunction with a suitable schlieren optical system (or a phase-sensitive optical system), for example as in FIG. 4, beams 19 can be made to bypass a schlieren mirror bar and/or stop and projects a spot on a projection screen of brightness proportional to the depth of deformation, while undiffracted light is blocked off by the mirror bar and/or stop. Layer 14 is used to concentrate the deformation at the mirror side of layer 11 and to reduce it at the other side. It also protects and seals the underlying layers from the bombardment of the addressing electron beam (eb) 16, sealing the beam chamber from outgassing from underlying e.g. layers 10, 11. The deformation 17 is preferably of sinusoidal type and shape. The substrate 13 is preferably of non-deformable material such as glass.

Figure 2:
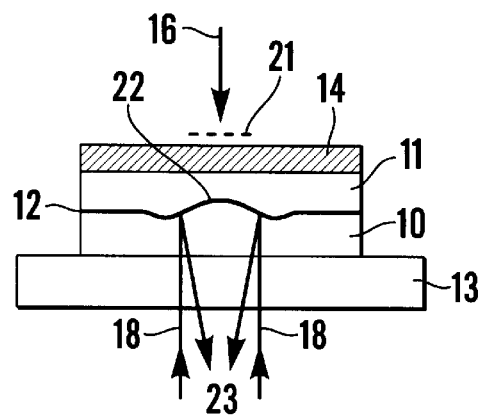
FIG. 2 illustrates the same modulator operating in a different mode.

In a second example shown in FIG. 2, a charge 21 produces deformation 22 that causes incident light rays 18 to be deflected and spread over an angle into rays 23, i.e. by a similar action to a curved mirror. Deflected light 23 may similarly pass a schlieren stop and projects a spot on a projection screen of brightness proportional to charge 21 and the magnitude of deflection, while undeflected light is blocked off by the stop. This embodiment may be expected to have less light modulation efficiency than the diffraction type of FIG. 1, as some of the deflected light will always be blocked off and lost by the stop. However, it may be suitable for some application requiring non-diffraction limited optical systems and components. The deformation may be designed by the charge to be of any desirable shape e.g. spherical, aspherical, cylindrical, parabolic . . . etc.

Figure 3:
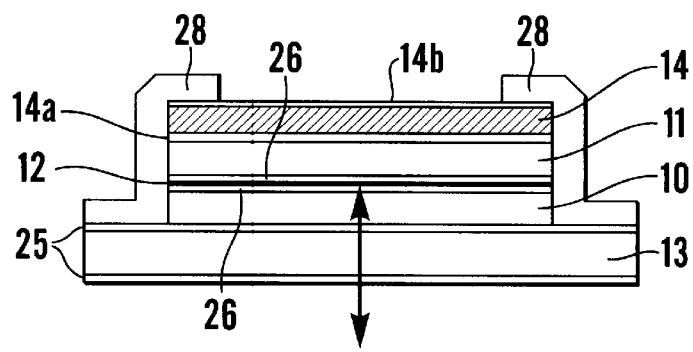
FIG. 3 illustrates a different embodiment of a light valve modulator according to the invention.

FIG. 3 shows an example in accordance with the invention in which one or more additional layer(s), e.g. 25, 26, are used providing one or more functions, among them: adaptation of coefficient of thermal expansion of various layers, adhesion promoters, barrier layers, and anti-reflection. The mirror layer and each deformable layer may comprise one or more layer(s) of one or more material(s). Layer 14 may comprise one or more dielectrically insulating layer(s) e.g. 14, 14a, 14b, of one or more material(s). Layer 14a preferably has low gas permeation rate for good gas-sealing properties such as Parylene, Siloxane, Formvar or Vacseal (RTMs). Layer 14b may be used to modify the secondary electron emission characteristics of the electron beam side of the modulator. For example, this layer could be Magnesium Fluoride $MgF_2$.

Figure 4:
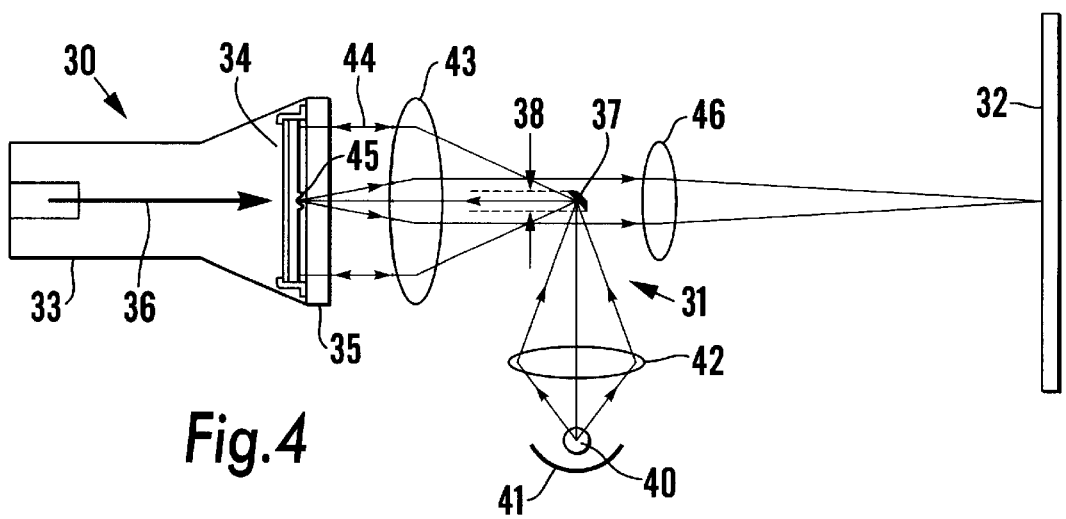
FIG. 4 illustrates a deformable light valve display tube operating in a projection television system.

FIG. 4 shows a deformable light valve display tube 30 controlled by an electron beam, together with a schlieren optical system 31 and an image projection screen 32. The tube 30 comprises an appropriate vacuum electron tube 33 with a light valve modulator 34 the substrate of which constitutes the faceplate 35. The electron beam 36 depicts charges on the inside layer of modulator 34 (e.g. layer 14 in FIGS. 1 and 2) in accordance with the image information to be displayed. The schlieren optical system 31 comprises a single mirror bar and stop (or multi-mirror bar and stop if desired 37 which may be made in the shape of a bar of width 39 i.e. the dimension across the light path so as to block off all or most undiffracted light, and length (not shown) running into the page. In the example, the light from a source 40 is collected by a parabolic reflector 41 and suitable lenses, 42, then imaged onto the mirror bar and stop 37. This reflects it towards schlieren lens 43 which produces parallel rays 44 which falls on the modulator 34. In the absence of deformation, rays 44 are reflected all the way back to the stop 37 and then to the source 40. They are thus blocked off from reaching screen 32. When a deformation 45 is present, incident light gets diffracted into plus and minus higher orders (as previously described) which passes the stop 37 and subsequently is collected by projection lens 46 which projects it on screen 32. By this means, the charge image on the modulator 34 is faithfully projected on the screen. The spot brightness depends on the magnitude or amplitude of the sinusoidal grating deformation, which in turn depends on the mechanical and geometrical properties of the deformable layers and the electric charge. The latter is appropriately controlled so as to produce brightness gradations of any desired levels. In the non-diffraction grating type, the brightness and modulation is proportional to the angular deflection of incident light which is proportional to the pixel dimensions and curvature depth. The light modulation action of the modulator may be achieved by one or more of the following processes: deflection, diffraction and refraction.

Once the charge is removed and the electrostatic potential is ceased, the modulator deformation should cease due to the elastic restoring forces of the deformable layers (and mirror) which return the mirror to a flat condition.

The incident light may be at any desired angle, normal or otherwise, and it may also be incident from the front (substrate side as shown) or from the back eb side if desired. In the latter case appropriate electron beam addressing has to be used; normal or oblique electron beam incidence may be used, as known to those skilled in the art.

Further Details

A diffraction grating deformation is effected by depositing appropriate charges (by electron beam of appropriate spot size and profile) so as to produce deformation in the form of preferably sinusoidal hills and valleys or grooves with height henceforth called "groove depth" which have similar optical effect to that of phase or diffraction grating. Each pixel may comprise one or more such grating(s) or groove(s) of, for example, cylindrical deformation or shape, with the cylindrical axis parallel to the schlieren mirror or stop bar(s). For a given modulator, groove depth is proportional to the charge magnitude and distribution. When the groove depth is not zero, a spot is projected on the screen with brightness proportional to the groove depth. Non-cylindrical gratings may also be used if desired together with appropriate schlieren mirror stop types. The mirror deformation is generally proportional to the square of the resulting electrostatic potential.

It is desirable to have the type of deformation compatible with the type and shape of the schlieren mirror bar(s) or stop(s). For example by arranging for more electron density at the middle of a groove or a pixel and less density towards the edges, more deformation takes place at the centre and less and less towards the edges. In another example, if the mirror bar stop is in the shape of a circular disc, then a spherical deformation and a circular or square pixel area may be preferable.

The resolution of the tube may be controlled by the pitch of the diffraction grating, and/or the number of gratings per pixel, and also on the pixel's height i.e. distance from top of pixel down to layer 12. The ratio of pixel's depth to pitch may vary according to the material(s) used and desired performance. For example, 0.5 ratio may be suitable for some materials and applications. Each material combination may have an optimum value of this ratio. Generally, the ratio may range from less than 0.1 to 2 or more.

For a given modulator, maximum groove depth may also depend on the frequency or pitch of deformation, thus the modulator dimensions and material properties may be chosen so as to give maximum groove depth at any desired pitch and operating voltage. Then the number of gratings/grooves per pixel may be chosen according to the desired image resolution, schlieren optical system, illumination source size, tube to screen distance and the desired image magnification. This latter feature of image magnification is very useful, especially in rear-projection applications where the tube to screen distance is usually short thus may require a modulator of relatively larger area.

There are a number of advantages of the diffraction grating method; a shallow groove depth can transform all or most light from the zero order giving higher sensitivity; due to the incompressibility of deformable layers, sinusoidal deformation may be achieved by optimising the diffraction grating pitch and deformable materials properties; the groove pitch may also be used for colour selection; the grooves of different diffraction gratings, each modulating a separate colour may overlap one another.

Deformable Layers

Deformable layers 10, 11, may be of any suitable type of polymer or elastomer of any desired physical chemical, electrical, mechanical, hardness, modulus, optical, reliability, properties and characteristics and preferably having a low outgassing rate. Deformable layer 10 should be optically clear, transparent and preferably of low haze and low scattering power for light being modulated. It may be conductive if desired. The deformable layer 11 should be of a dielectric insulating material and of an appropriate dielectric strength or breakdown, permittivity and time constant. Some examples of deformable layers are: Silicone rubber such as Dow Corning Sylgard 184, Sylgard 182, (RTMs) Silicone rubber 734, 732, 3140, MDX44210, and Silicone Gels if desired, or an appropriate mixture of ay one or more of them. Any suitable and appropriate technique known to those skilled in the art may be used to coat and apply the deformable layers such as for example; spin coating, gravity-settled coating, dipcoating, roller coating, plasma and glow discharge polymerization, gas phase deposition, Langmuir-Blodgett monolayers, sputtering, casting against a surface or mould.

Mirror

The mirror 12 may be made of any appropriate and suitable material, alloy or a combination of them, of one or more layer of one or more material(s). It is preferably of high reflectivity and appropriate thickness and opacity to the light being modulated, and electrically conductive to facilitate appropriate electrical connection. Examples are: Aluminum, Silver, Gold, Indium, Nickel, Copper, Titanium and alloys and mixtures of these materials. It should preferably have good adhesion to the underlying layer in order not to become detached during deformation. For example, a thin transparent adhesion promoting layer may be used first such as Au, Ti, Cr, Al, SiO2 . . . etc. Any appropriate technique known to those skilled in the art may be used to deposit the mirror among them; sputtering, bias sputtering, ion plating, resputtering, ion implantation, CVD, PVD, PECVD, photochemical assisted deposition, ion-assisted deposition, oblique and substrate rotation deposition, in-situ glow discharge plasma cleaning (e.g. in oxygen), electro-deposition, electroless deposition. The glow discharge plasma treatment in an appropriate gas of first (and second) deformable layer may be especially beneficial to the mirror and its adhesion as this process effects surface cleaning, and the formation of good adhesion promotion layers on the deformable layer, as well as effecting cross-linking, activation and surface energy (CASE).

Dielectric Layers 14, 14a, 14b

One or more of the following may be used/applied or refer to one or more of layers 14, 14a, 14b:

Good dielectric strength, and is preferably stiffer and harder to bend or deform than the deformable layers 10, 11. It is preferably substantially non-porous and pinhole/void-free to isolate/seal the deformable layers from the electron beam and vacuum chamber on its own and/or in conjunction with any additional appropriate layer(s). Preferably, its thickness if at least greater than the maximum electron beam penetration range and distribution. It preferably has low gas permeation rate to outgassed substances from the deformable and underlying layers, and have appropriate and desirable secondary electric emission ratio, vacuum compatibility, low outgassing, and low vapour pressure. Any appropriate and suitable fabrication techniques, preferably compatible with the maximum allowable deformable layers temperature known to those skilled in the art may be used, such as those described for the mirror layer, and also similar to layers used for passivating integrated circuits. Some examples of layer 14 material may be: Silicon Nitride, Silicon Dioxide, a combination of Si3N4+SiO2, Alumina (AL2O3), Alkaline Earth Aluminosilicate glass (Dow Corning 1723, 1720), Soda Lime glass (Dow Corning 0080) and Mica. Alternatively, it may be made elsewhere and subsequently placed into the modulator.

Miscellaneous/Additional Layers and Techniques

One or more layers behind the mirror may be made of opaque material to light being modulated.

It is preferable to reduce mobile metallic ions in the layers of the modulator and especially in the deformable layers which may be achieved by appropriate means known to those skilled in the art among them; using clean room processing etc. and/or by additional layers acting as barriers and/or neutraliser for the ions.

All the layers used in the modulator should adhere well to one another and if necessary one or more additional intermediate layer(s) may be used to facilitate this (and other) purpose(s).

The pixel's shape or area may be of any appropriate type or dimensions e.g. square or rectangular or circular. As an example, for a TV projection application of 1000 line resolution, one pixel area may be 10 microns×10 microns, each containing one or more diffraction grating, leading to a target area on the modulator or approximately 1 sq. cm per primary colour. One example of the thicknesses of the layers may be: layer 14 approx. 2 microns; layer 11 approx. 5 microns; layer 12 approx. 0.05 microns; layer 10 approx. 5 microns. Thicker or thinner layers may however by used to suit different applications.

A peripheral seal 28 may be used around the periphery of the modulator in order to seal the deformable layers from the electron beam vacuum environment and cathode, and/or provides electron beam bombardment protection. One or more of the following techniques/method may be used by way of example; apply the seal of any appropriate material over the periphery of layers such that it covers all layers down to the substrate; extend layer 14, 14a and/or deposit additional thicker layer (via appropriate mask) over the peripheral border by using suitable deposition techniques, with good step coverage; cover the border with electron beam resistant material, e.g. metal ring or cap. The modulator layers may extend outside the electron beam tube if desired. The modulator may be made on an appropriate substrate, and then glued to the inside faceplate of the electron beam tube with appropriate material of desired optical quality.

Features and Advantages

The mirror reflector is unstructured leading to dark background illumination and high contrast ratio. The layers are firmly attached to and well supported by the thick substrate which first allows the thicknesses of all the layers to the optimised in accordance with desired resolution and other parameters and features mentioned earlier, rather than themselves having to provide mechanical support and second, provide efficient thermal dissipation.

By proper choice of materials, charge storage time may be controlled as desired which allows image storage capabilities. In conjunction with an appropriate erasing technique (see later), duty cycle ratio for TV applications may approach 100% resulting in very high optical efficiency.

Electron Beam Addressing/Driving

Writing and erasing, for single and multi-colour applications, may be done by one or more electron beams which may share common scanning parts. Both writing and erasing may each be of negative or positive (by SEE) types as known to those skilled in the art. When separate write and erase electron beams are used, either cathode or anode may be grounded or connected together.

The modulator may be erased by flood electron beam which constantly subjects it to a uniform flood of electrons of such magnitude and level as to cause the discharge and decay of the charge pattern and the electrostatic potential in a time approximately equal to the TV frame time. This erasure is continuous through all successive TV frame times. Alternatively a scanned erase may be used with an electron beam spot scanned in the x-y direction i.e. similar to the write process, or it may be of a-line-at-a-time type with the electron beam having a line shape scanned in either the x or y direction and preferably in the vertical direction for TV raster applications.

A technique to reduce the secondary emission redistribution problem may be used if desired in which the modulator is always maintained at a uniform potential e.g. DC bias, by appropriate charging or discharging, which is preferably above the potential caused by the redistribution effect.

Any electron beam writing and erasing mode may be applied using standard techniques known to those skilled in the art for example connecting the mirror electrode as the anode of the electron beam tube and choosing appropriate tube voltages and bias. An imagewise charge pattern, e.g. as in TV raster, written by the electron beam on the modulator can be projected on the screen for viewing. In real-time applications like TV, the imagewise charge pattern is changed every frame time. Further examples may be found in the prior art mentioned earlier i.e. IBM's DSDT and also in Oil-film light valves like the "Eidophor".

The undesirable effect of secondary emission redistribution, i.e. contrast ratio degradation, may be significantly reduced by choosing electron beam current and modulator operating voltage such that the voltage of the minimum brightness level, Vb, may be above that caused by secondary emission redistribution effect, and that the voltage of the maximum brightness level desired, Vm, may be appropriately chosen such that it result in desired contrast ratio, CR. CR equals (Vm/Vb) squared. Also, the mirror bar(s)/stop(s) may be chosen so as to block off all light modulated by any voltage below Vb. For example, if Vb=20 volts, Vm=400 volts, then CR=400. The materials, dimensions and design of the modulator may be so chosen so as to operate it at these or any other operating voltage levels.

The electron beam may have a constant current and profile, and modulation may be achieved by defocussing the electron beam, or by modulating electron beam scanning speed or by electron beam wobble along scan lines similar for example to the Eidophor or GE-LV. A combination of these techniques may also be used if desired.

Figure 5:
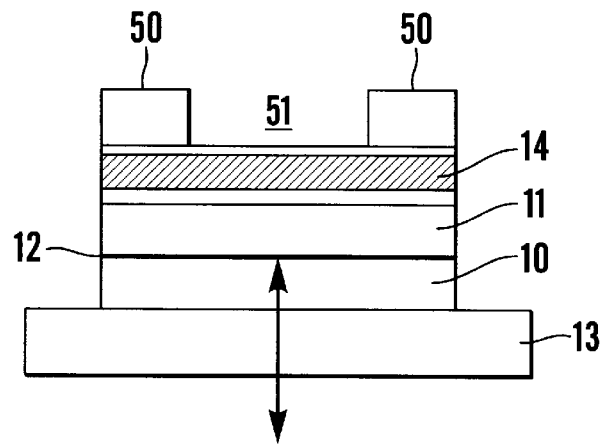
FIG. 5 illustrates another modified light valve modulator.

In another embodiment, an additional conductive electrode in the form of a grid may be deposited over the top dielectric layer (14 in FIG. 1 or 2). The purpose of the grid is similar to that of the grid used in barrier grid electron tubes i.e. for the efficient collection of secondary emission without the problem of redistribution effects. The grid may also be used as a modulating electrode. The presence of the grid may also be used to advantage in causing more deformation at the centre of the opening (one or more openings per pixel) than at the edges which may improve the light valving efficiency. An electron beam of appropriate profile may further improve these functions. An example is shown in FIG. 5 which is similar to that of FIGS. 1–3 but with the addition of a conductive grid 50 of appropriate thickness or height. The opening 51 in the grid layer may have any appropriate and desired shape such as rectangular, honeycomb, square or round and may be chosen in conjunction with appropriate schlieren stop/bar system for optimising efficiency. Any suitable beam indexing method may be used if desired including direct pickup from the grid.

Colour

The invention may be used in a light valve system similar to that of the General Electric Oil-Film LV "GELV" with simultaneous colour projection. Different diffraction gratings of different pitch, produced by various control techniques on the electron beam and/or horizontal and vertical scanning coils, each modulate and control one colour. In this case, a reflective modulator is used which is similar to that of the GELV in principle but different in details to account for the reflective system. The operating voltage of each grating may be similar or different.

The modulator may be used in any appropriate colour projection system known to those skilled in the art. For example, three modulators may be used one per primary colour, either sharing a common tube or separate tubes, together with appropriate colour separation filter and optical projection systems. Also, sequential colour wheel may be used.

Also, dynamic convergence may be used by monitoring the colour registration and then appropriately controlling the size of each individual colour and its scanned target area so as to effect registration i.e. similar to the "Eidophor" system.

Optical Systems

The deformable light valve modulators of the present invention may be used with any appropriate combination of light source, schlieren optical system, mirror bars or stops . . . etc. known to those skilled in the art as, for example, systems similar to those used in the Eidophor and other oil-film LVs. The complete optical projection systems may be of any desired type such as: on-axis, off-axis, front or rear projection. Dark or bright field applications may be used.

In a rear-projection system in which each tube displays a part of the full picture i.e. like a "tiled" display, the projected pictures may be edge matched, and treated for colour convergence and/or image resize by dynamic scheme (described above) if desired. This can produce a substantially seamless large picture projection without making the screen to tube distance too large.

Other Embodiments, Techniques and Applications

Figure 6:
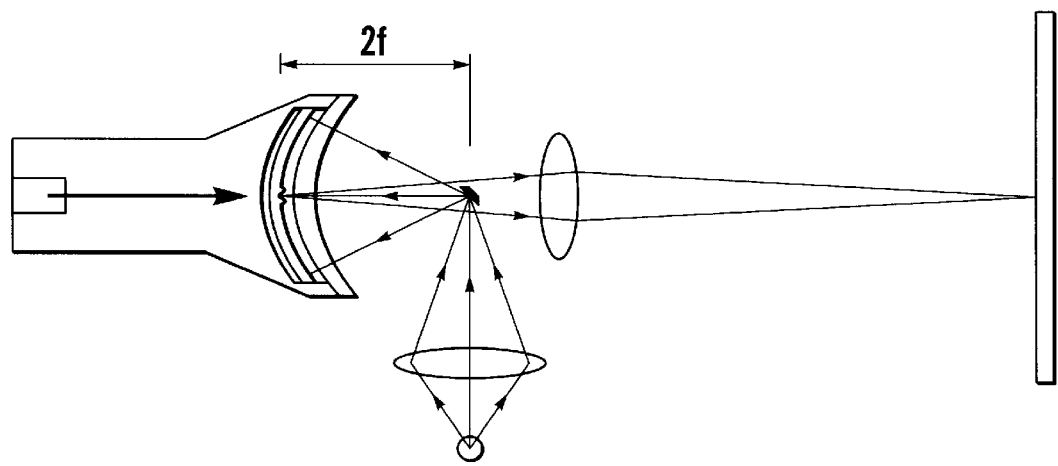
FIG. 6 illustrates a different form of deformable light valve modulator and display tube.

Alternative embodiments of the invention may be made, all of which may use similar addressing techniques and schlieren optical systems. Some examples of these are explained below. The modulator and display tubes may also have a curved structure such that the mirror becomes an optical curved mirror which may also provide the function of and replace the schlieren lens (e.g. 43 in FIG. 4). An example of this is shown in FIG. 6 (other details are similar to FIG. 4). Further details on this are as in the Eidophor. A cylindrically curved embodiment together with appropriate light source and optics may also be made which may have a simpler fabrication procedure as by for example dipcoating deformable layers by rotating around the cylinder's axis of symmetry, or by spin coating such surface with symmetry axis lying in the spin coater's radial direction.

The electron beam may be scanned or addressed in such a way that the pixels and/or the diffraction grating are constantly and gradually being shifted or moved around their position by an appropriate and desired amount and speed. This may range from a fraction of a pixel's pitch up to one or more pitch(es). Any desirable pixel path may be chosen but preferably along a loop path such as, for example, by moving the pixel in the following sequence: left, up, right, down and so on. This continuous pixel movement can be advantageous in reducing the magnitude of the deformable layers' compression set, fatigue and aging. The hills and valleys of diffraction grating deformation may preferably be constantly swapped in position at any desired speed.

Instead of the conductive mirror, a dielectrically insulating mirror may be used and, for facilitating electrical connection, at least one electrically conductive layer transparent or otherwise may be disposed on at least one side of said mirror.

All embodiments of the present invention may alternatively be operated with repulsive electrostatic forces, or both attractive and repulsive electrostatic forces if desired.

If desired, harmless outgassing of sufficiently low vapour pressure gases may be tolerated and thus may not require a seal.

In yet another application, the modulator may be used as the final target (with the deformable reflector as the final anode) of an image-intensifier or multiplier with single or multi stages with or without gains.

Fabrication may be started either from the substrate upwards, or the reverse using above-mentioned techniques and any others known to those skilled in the art.

Baking and outgassing of electron beam vacuum tubes and modulators may be achieved at any appropriate temperature and for any desired period of time. Outgassing may also be performed at high temperature while immersing the faceplate in an appropriately cooling bath in which case the faceplate of the electron beam tube may be made from good thermal conductivity material e.g. alumina, sapphire . . . etc.

Alternatively, the modulator and faceplate may be baked at lower temperature and then sealed to the tube. Also, the deformable layers may be outgassed prior to depositing the mirror and layer 14.

I claim:

1. A light valve modulator of reflective operation which includes a multi-layer structure which is controlled electrostatically, comprising a transparent substrate (13) supporting a first transparent deformable layer (10) and a second insulating dielectric deformable layer (11), with a mirror layer (12) sandwiched between, and a third, dielectric insulating layer (14) on the outside of the second layer (11), at least one of the layers between the second layer (11) and the substrate (13) being electrically conductive, so that when the third dielectric layer (14) receives an electric charge pattern (15) by means of one or more electron beams (16), the mirror layer (12) is locally deformed by electrostatic forces occurring between the charge pattern (15) and the conductive layer.

2. A light valve modulator as claimed in claim 1, wherein the mirror layer (12) comprises one or more layers of one or more materials of which at least one is conductive.

3. A light valve modulator as claimed in claim 1, wherein the first and second layers (10, 11) are elastomers.

4. A light valve modulator as claimed in claim 1, wherein each deformable layer comprises one or more layers of one or more materials.

5. A light valve modulator as claimed in claim 1, wherein the third layer (14) comprises one or more layers at least one of which has properties which protect underlying layers from electron bombardment.

6. A light valve modulator as claimed in claim 5, wherein at least one (14a) of said layers has a low gas permeation rate for gases released from one or more underlying layers.

7. A light valve modulator as claimed in claim 1, wherein the multi-layer structure is curved such that it has any desired optical curvatures and properties.

8. A light valve modulator as claimed in claim 1, wherein the third layer comprises one or more layers and at least one layer of the third layer is more rigid than the two deformable layers.

9. A light valve modulator as claimed in claim 1, wherein the local deformation of the mirror layer (12) is such as to effect light control substantially by diffraction processes.

10. A light valve modulator as claimed in claim 1, further comprising another conductive layer (50) on the outside of the third layer having opening (51) of any desired shape, inside which charge is deposited that cause mirror deformation, said other conductive layer being appropriately biased to collect secondary electrons.

11. A deformable light valve (DLV) display tube (30) comprising an envelope (33) with a transparent faceplate (35) facing one or more electron guns (36), wherein a light valve modulator (34) as claimed in claim 1 is mounted within said faceplate (35).

12. A DLV display tube as claimed in claim 11, wherein the faceplate (35) forms said transparent substrate (13).

13. A DLV display tube as claimed in claim 11, wherein the periphery of the multi-layer structure is vacuum-tight sealed to said substrate.

14. A DLV display tube as claimed in claim 11, wherein charge pattern erasure is effected by continuously operating a flood electron beam or gun, chosen so as to cause erasure over any desired TV frame time or any other period of time.

15. A DLV display tube as claimed in claim 14, wherein one electron gun writes said charge pattern and a second electron gun performs the erase function.

16. A DLV display tube as claimed in claim 11, wherein an existing charge pattern on the third layer (14) is erased by a scanning electron beam either one or more lines at a time or one or more pixels at a time.

17. A DLV display tube as claimed in claim 16, wherein one electron gun writes said charge pattern and a second electron gun performs the erase function.

18. A DLV display tube as claimed in claim 11, wherein the position of deformation or the hills and valleys of each pixel is varied or swapped at any desired frequency so as to avoid damage to the light valve structure.

19. A DLV display tube as claimed in claim 11, having an electron beam current, a light valve modulator operating voltage and a minimum brightness level voltage, wherein the electron beam current and the light valve modulator operating voltage are such that the minimum brightness level voltage ($V_b$) is above that caused by secondary electron emission redistribution effect.

20. A DLV display tube as claimed in claim 11, wherein a single light valve assembly controls two or more different colour lights by writing two or more different diffraction grating patterns or grooves of different wavelengths simultaneously in the same modulator.

21. A projection television system comprising a deformable light valve display tube as claimed in claim 11, and a schlieren-type optical system.

22. A projection television system comprising a light source, a schlieren-type optical system (31), a screen (32) and one or more DLV display tubes (30) as claimed in claim 11, wherein the latter is controlled by signals which cause the light valve modulator (34) to modulate light received from the light source (40) whereby the optical system projects a television-type picture on the screen.

23. A projection television system comprising a plurality of individual television systems as claimed in claim 22 without individual screens; wherein the television-type picture that is projected from each of the individual television systems is projected onto a single screen so that a plurality of said projected television-type pictures appear together on said single screen, further wherein the plurality of said projected television-type pictures are positioned edge to edge and the content of the projected pictures is matched at the respective edges so as to form a substantially continuous picture over the extent of said single screen.

24. A projection television system as claimed in claim 22, wherein the television system has a frame time and frequency of any desired value including a frame time and frequency that results in static pictures on the screen.

25. A projection television system comprising a light source, a schlieren-type, optical system, a screen and one or more DLV display tubes as claimed in claim 11, wherein the latter is controlled by signals which cause each light valve modulator to modulate one or more primary color light received from the light source whereby the optical system projects a color television-type picture on the screen.

* * * * *

UNITED STATES PATENT AND TRADEMARK OFFICE
CERTIFICATE OF CORRECTION

PATENT NO. : 5,822,110
DATED : October 13, 1998
INVENTOR(S) : Rad Hassan Dabbaj

It is certified that error appears in the above-identified patent and that said Letters Patent is hereby corrected as shown below:

Abastract, first line in second paragraph, " deformably" should be -- deformable --.

Signed and Sealed this

Eleventh Day of May, 1999

Attest:

Q. TODD DICKINSON

Attesting Officer     Acting Commissioner of Patents and Trademarks

UNITED STATES PATENT AND TRADEMARK OFFICE
CERTIFICATE OF CORRECTION

PATENT NO. : 5,822,110
DATED : October 13, 1998
INVENTOR(S) : Rad H. Dabbaj

It is certified that error appears in the above-identified patent and that said Letters Patent is hereby corrected as shown below:

On the title page, item [75], in the "Inventor" section, the inventor's name and address should be changed from "Rad Hassan Dabbaj, Williams, Powell & Associates, 34 Tavistock Street, London, England, WC 2E 7PB" to -- Rad H. Dabbaj, Flat 4, 3 Westbourne Crescent, London, W2 3DB, United Kingdom--.

Signed and Sealed this

Nineteenth Day of September, 2000

Q. TODD DICKINSON

*Attest:*

*Attesting Officer*    *Director of Patents and Trademarks*

(12) REEXAMINATION CERTIFICATE (4387th)
United States Patent
Dabbaj

(10) Number: US 5,822,110 C1
(45) Certificate Issued: Jun. 26, 2001

(54) REFLECTIVE LIGHT VALVE MODULATOR

(75) Inventor: Rad Hassan Dabbaj, Williams, Powell & Associates, 34 Tavistock Street, London (GB), WC2E 7PB

(73) Assignee: Rad Hassan Dabbaj, Slough (GB)

Reexamination Request:
No. 90/005,595, Dec. 17, 1999

Reexamination Certificate for:
Patent No.: 5,822,110
Issued: Oct. 13, 1998
Appl. No.: 08/793,643
Filed: May 13, 1997

Certificate of Correction issued May 11, 1999.

(22) PCT Filed: Sep. 1, 1995

(86) PCT No.: PCT/GB95/02061
§ 371 Date: May 13, 1997
§ 102(e) Date: May 13, 1997

(87) PCT Pub. No.: WO96/08031
PCT Pub. Date: Mar. 14, 1996

(30) Foreign Application Priority Data

Sep. 2, 1994 (GB) .................................................. 9417756
Apr. 7, 1995 (GB) .................................................. 9507306

(51) Int. Cl.$^7$ .................................................. G02B 26/00
(52) U.S. Cl. ..................... 359/293; 359/291; 359/295; 359/846; 348/771; 348/772
(58) Field of Search .................................... 359/291, 293, 359/295, 846, 292; 348/770, 771, 772, 775; 313/394; 430/50, 67

(56) References Cited

U.S. PATENT DOCUMENTS

| | | | |
|---|---|---|---|
| 2,910,532 | 10/1959 | Auphan | 348/770 |
| 3,667,830 * | 6/1972 | Rottmiller | 359/292 |
| 3,676,588 * | 7/1972 | Kozol et al. | 348/772 |
| 3,746,911 * | 7/1973 | Nathanson et al. | 348/771 |
| 3,835,346 * | 9/1974 | Mast et al. | 313/394 |
| 3,858,080 | 12/1974 | Wohl | 313/394 |
| 4,018,603 | 4/1977 | Sheridon et al. | 430/67 |
| 4,021,236 | 5/1977 | Sheridon et al. | 430/50 |
| 4,065,308 | 12/1977 | Bergen | 430/50 |
| 4,119,368 | 10/1978 | Yamazaki | 359/291 |

OTHER PUBLICATIONS

Yoshihiro Asano, "Elastomer Display Device" Review of the Electrical Communication Laboratories vol. 26, Nos. 3–4, Mar.–Apr., 1978.

B. James Ross, Eugene T. Kozol, "Performance Characteristics of the Deformographic Storage Display Tube (DSDT)", 1973 IEEE Intercon Technical Papers (Mar. 26–30, 1973).

(List continued on next page.)

*Primary Examiner*—Loha Ben

(57) ABSTRACT

A light valve modulator of reflective operation which includes a multi-layer structure which is controlled electrostatically, comprises a transparent substrate supporting a first transparent deformable layer and a second insulating dielectric deformable layer, with a mirror layer sandwiched between, and a third, dielectric insulating layer on the outside of the second layer, at least one of the layers between the second layer and the substrate being electrically conductive, and the third dielectric layer being capable of receiving an electric charge pattern by means of one or more electron beams, whereby the mirror layer is locally deformed by electrostatic forces occurring between the third layer and the conductive layer.

The twin deformably layers allow good sensitivity, while the outside dielectric layer which receives charge from an electron beam protects the deformable layers from electron bombardment and the cathode from outgassing.

The modulator is for use in display tubes, particularly for projection TV.

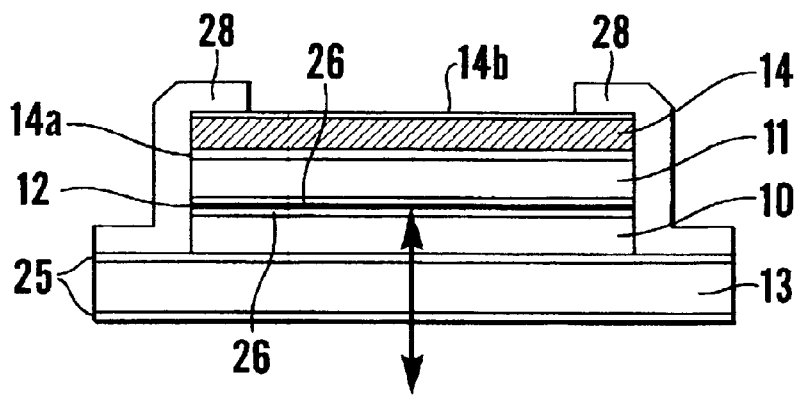

OTHER PUBLICATIONS

IBM Technical Disclosure Bulletin vol. 15, No. 5, Oct. 1972 "Deformographic Film with Barrier Layer in Target Assembly" p. 1677.

*Electronic Image Storage,* B. Kazan and M. Knoll, Academic Press 1968, pp. 2–4, 27–29, 134–141.

W. E. Glenn, "Principles of Simultaneous–Color Projection Television using Fluid Deformation" Sep. 1970, Journal of the SMPTE, vol. 79, 788–794.

R. Noel Thomas, "The Mirror–Matrix Tube: A Novel Light Valve for Projection Displays" IEEE Transactions on Electron Devices, vol. ED–22, No. 9, Sep. 1975, pp. 765–775.

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–25 is confirmed.

New claims 26–39 are added and determined to be patentable.

26. *A light valve modulator of reflective operation for projecting images which includes a multi-layer structure which is controlled electrostatically by one or more electron beams that provides an imagewise electric charge pattern that is changeable at frame rates equivalent to television frame rates, comprising a transparent substrate (13) supporting, a first transparent deformable layer (10) and a second insulating dielectric deformable layer (11), with a mirror layer (12) sandwiched between, and a third, dielectric insulating layer (14) on the outside of the second layer (11), at least one of the layers between the second layer (11) and the substrate (13) being electrically conductive, so that when the third dielectric layer (14) receives an imagewise electric charge pattern (15) by means of one or more electron beams (16) at said frame rates, the mirror layer (12) is locally deformed by electrostatic forces occurring between the charge pattern (15) and the conductive layer.*

27. *The light valve modulator of claim 26 wherein said mirror layer moves toward its condition prior to deformation when said imagewise electric charge pattern is removed.*

28. *The light valve modulator of claim 27 wherein said mirror layer movement toward its condition prior to deformation results from elastic restoring forces of said first and second deformable layers.*

29. *The light valve modulator of claim 26 wherein said mirror layer is restorable from its deformed condition upon removal of said imagewise charge pattern.*

30. *The light valve modulator of claim 26 wherein said mirror layer moves away from its deformed condition upon removal of said imagewise charge pattern.*

31. *The light valve modulator of claim 30 wherein said mirror layer movement away from its deformed condition results from elastic restoring forces of said first and second deformable layers.*

32. *The light valve modulator of claim 30 wherein said first and second layers are formed of materials that are deformable and restorable at time periods compatible with said frame rates such as television frame rates.*

33. *The light valve modulator of claim 32 wherein said first and second layers are elastomers.*

34. *A light valve modulator of reflective operation for projecting images at any of video, television and equivalent frame rates which includes a multi-layer structure which is controlled electrostatically, comprising a transparent substrate (13) supporting, a first transparent deformable layer (10) and a second insulating dielectric deformable layer (11), with a mirror layer (12) sandwiched between, and a third, dielectric insulating layer (14) on the outside of the second layer (11), at least one of the layers between the second layer (11) and the substrate (13) being electrically conductive, so that when the third dielectric layer (14) receives an electric charge pattern (15) by means of one or more electron beams (16), the mirror layer (12) is locally deformed by electrostatic forces occurring between the charge pattern (15) and the conductive layer.*

35. *The light valve modulator of claim 34 wherein said first and second layers are elastomers.*

36. *A light valve modulator of reflective operation for projecting moving images including television images which includes a multi-layer structure which is controlled electrostatically, comprising a transparent substrate (13), supporting a first transparent deformable layer (10) and a second insulating dielectric deformable layer (11), with a mirror layer (12) sandwiched between, and a third, dielectric insulating layer (14) on the outside of the second layer (11), at least one of the layers between the second layer (11) and the substrate (13) being electrically conductive, so that when the third dielectric layer (14) receives an electric charge pattern (15) by means of one or more electron beams (16), the mirror layer (12) is locally deformed by electrostatic forces occurring between the charge pattern (15) and the conductive layer.*

37. *A light valve modulator of reflective operation for projecting images at any of video, television and equivalent frame rates which includes a multi-layer structure which is controlled electrostatically, comprising a transparent substrate (13) supporting, a first transparent deformable layer (10) and a second insulating dielectric deformable layer (11), with a mirror layer (12) sandwiched between, and a third, dielectric insulating layer (14) on the outside of the second layer (11), at least one of the layers between the second layer (11) and the substrate (13) being electrically conductive, so that when the third dielectric layer (14) receives an electric charge pattern (15) by means of one or more electron beams (16), the mirror layer (12) is locally deformed by electrostatic forces occurring between the charge pattern (15) and the conductive layer, wherein the first and second layers are elastomers.*

38. *A light valve modulator of reflective operation for projecting images at any of video, television and equivalent frame rates which includes a multi-layer structure which is controlled electrostatically, comprising a transparent substrate (13) supporting, a first transparent deformable layer (10) and a second insulating dielectric deformable layer (11), with a mirror layer (12) sandwiched between, and a third, dielectric insulating layer (14) on the outside of the second layer (11), at least one of the layers between the second layer (11) and the substrate (13) being electrically conductive, so that when the third dielectric layer (14) receives an electric charge pattern (15) by means of one or more electron beams (16), the mirror layer (12) is locally deformed by electrostatic forces occurring between the charge pattern (15) and the conductive layer, wherein the third dielectric insulating layer (14) comprises one or more layers at least one of which has properties which protect underlying layers from electron bombardment.*

39. *A deformable light valve (DLV) display tube (30) comprising an envelope (33) with a transparent faceplate (35) facing one or more electron guns (36) and a light valve modulator of reflective operation (34) for projecting images at any of video, television and equivalent frame rates mounted within the faceplate, wherein the light valve modulator of reflective operation (34) includes a multi-layer structure which is controlled electrostatically, comprising a* transparent substrate (13) supporting, a first transparent deformable layer (10) and a second insulating dielectric deformable layer (11), with a miror layer (12) sandwiched between, and a third, dielectric insulating layer (14) on the outside of the second layer (11), at least one of the layers between the second layer (11) and the substrate (13) being electrically conductive, so that when the third dielectric layer (14) receives an electric charge pattern (15) by means of one or more electron beams (16), the mirror layer (12) is locally deformed by electrostatic forces occurring between the charge pattern (15) and the conductive layer.

* * * * *